United States Patent [19]

Badie et al.

[11] Patent Number: 4,983,682

[45] Date of Patent: Jan. 8, 1991

[54] PROCESS FOR THE MANUFACTURE OF PETROLEUM RESINS SUITABLE FOR THE MANUFACTURE OF PRINTING INKS, VARNISHES AND PAINTS

[75] Inventors: Paul Badie, Lixing-les-Saint Avold; Jean-Marie Siebert, Forbach, both of France

[73] Assignee: Norsolor S.A., Paris, France

[21] Appl. No.: 361,069

[22] Filed: Jun. 5, 1989

[30] Foreign Application Priority Data

Jun. 3, 1988 [FR] France .................... 88 07420

[51] Int. Cl.$^5$ ............................. C08F 279/00
[52] U.S. Cl. ........................ 525/290; 526/290
[58] Field of Search .................. 525/290; 526/290

[56] References Cited

U.S. PATENT DOCUMENTS

| | | | |
|---|---|---|---|
| 3,987,123 | 10/1976 | Lepert | 525/290 |
| 4,283,518 | 8/1981 | Iwashita et al. | 526/290 |
| 4,558,107 | 12/1985 | Evans et al. | 526/290 |

FOREIGN PATENT DOCUMENTS

| | | | |
|---|---|---|---|
| 0139709 | 7/1985 | Japan | 525/290 |
| 0228515 | 11/1985 | Japan | 525/290 |

*Primary Examiner*—Lewis T. Jacobs
*Assistant Examiner*—Vasu S. Jagannathan
*Attorney, Agent, or Firm*—Millen, White & Zelano

[57] ABSTRACT

A process for the production of aromatic petroleum resins by the cationic copolymerization of a $C_6$–$C_{12}$ aromatic cut and the product obtained by the thermal polymerization of a dicyclopentadiene cut, products produced by the process, and the application in the manufacture of printing inks, varnishes and paints.

22 Claims, No Drawings

PROCESS FOR THE MANUFACTURE OF PETROLEUM RESINS SUITABLE FOR THE MANUFACTURE OF PRINTING INKS, VARNISHES AND PAINTS

BACKGROUND OF THE INVENTION

The present invention relates to a process for the manufacture of petroleum resins suitable for the manufacture of, e.g., printing inks, varnishes and paints.

In certain applications, in particular in the field of printing inks, varnishes and paints, it is necessary to have available petroleum resins which have a high softening point combined with good dilutability and good solubility in solvents, particularly in aliphatic solvents. The petroleum resins which have been available until now have a dilutability and a solubility in solvents, in particular in aliphatic solvents, which is too low to make feasible their use in the manufacture of printing inks and varnishes.

SUMMARY OF THE INVENTION

The present invention relates to aromatic petroleum resins and a process for the manufacture of aromatic petroleum resins. These resins are suitable for, e.g., the manufacture of printing inks, varnishes and paints.

Upon further study of the specification and appended claims, further aspects and advantages of this invention will become apparent to those skilled in the art.

The aromatic petroleum resins of this invention can be prepared by the cationic copolymerization of a product comprising a $C_6$-$C_{12}$ aromatic cut and of the product obtained by the thermal polymerization of a dicyclopentadiene cut. The products are copolymerized in a dicyclopentadiene resin/aromatic cut weight ratio of between 0–100, preferably between 0 and 50, preferably between 15 and 50, and also preferably 2 to 10. The resin obtained by the thermal polymerization of a dicyclopentadiene cut is dissolved in the $C_6$-$C_{12}$ aromatic cut before the copolymerization of the two types of products.

It has been found that the aromatic petroleum resins obtained according to the process of the application exhibited simultaneously high softening points, e.g., 120° to 170° C., associated with good dilutability and solubility in solvents, in particular aliphatic solvents, more particularly aliphatic hydrocarbon solvents. This permits their use in the manufacture of printing inks, paints and varnishes.

The resins manufactured according to the process of the application are obtained by copolymerizing two types of products by a cationic route. The first type of products consists of the product obtained by the thermal polymerization of a dicyclopentadiene cut. The thermal polymerization of the dicyclopentadiene cut is carried out continuously, for example, by maintaining a mixture comprising the dicyclopentadiene cut and an aromatic solvent, in a weight ratio of 50/50, at 240°–270° C. for 2 to 10 hours. The dicyclopentadiene cut, which generally has the following composition (% by weight), originates from the steam cracking of a petroleum cut:

| | |
|---|---|
| dicyclopentadiene | 70–95 |
| dicyclopentadiene codimers | 1–6 |
| methyldicyclopentadiene | 0.2–10 |
| trimethyldicyclopentadiene | 0.005–2 |

-continued

| | |
|---|---|
| 5-vinylnorbornene | 1–2 |
| isopropylnorbornene | 1–12 |
| (unidentified light ends) | less than 30 |

The second type of product used in the process of the invention consists of a $C_6$-$C_{12}$ aromatic cut. This $C_6$-$C_{12}$ aromatic cut originates in most cases from the steam cracking of a petroleum feedstock which includes naphtha, kerosene and gas oil and, generally, any feedstock usually employed as a petroleum feedstock. The petroleum feedstocks generally have a boiling point of 20° to 245° C.; $C_6$-$C_{12}$ aromatic cuts and cuts containing cyclic diolefins are collected by fractionation and distillation. The composition of this $C_6$-$C_{12}$ cut can vary and depends on the nature of the petroleum feedstock; in general, the composition of the polymerizable products is the following (in % by weight):

| | |
|---|---|
| styrene | 0.5–14 |
| allylbenzene | 0.5–2 |
| α-methylstyrene | 1–8 |
| cis-β-methylstyrene | 0.2–1 |
| trans-β-methylstyrene | 1–6 |
| vinyltoluenes | 7–22 |
| indene | 5–21 |
| methylindene + divinylbenzene | 0.2–9 |
| dicyclopentadiene | 0.4–12 |

The process of the present application is performed by a cationic copolymerization of the two types of products defined above, with the product obtained by polymerization of a dicyclopentadiene cut being redissolved in the $C_6$-$C_{12}$ aromatic cut. The cationic polymerization is carried out in a known manner, at a temperature not exceeding 50° C., in the presence of Lewis acid(s) employed in a quantity of between 0.02 and 3% by weight relative to the weight of the two products used. Boron trifluoride or its complexes are nonlimiting examples of Lewis acids.

According to the invention, the two types of products used for performing the process of the invention are employed in any dicyclopentadiene resins/aromatic cut weight proportions of 0 to 100, particularly from 0 to 50, and also particularly 2 to 10 and 15 to 50.

The resins obtained according to the process of the invention are suitable in many fields of application. In particular, by virtue of a high softening point of 120° C. and above, combined with good dilutability and solubility in solvents, in particular aliphatic solvents, these resins are suitable for the manufacture of varnishes, paints and printing inks. When used in the manufacture of varnishes, paints and printing inks, they are added, e.g., in a proportion of 40 to 60% by weight with 60 to 40% of a mixture of aliphatic solvents.

Without further elaboration, it is believed that one skilled in the art can, using the preceding description, utilize the present invention to its fullest extent. The following preferred specific embodiments are, therefore to be construed as merely illustrative, and not limitative of the remainder of the disclosure in any way whatsoever.

In the foregoing and in the following examples, all temperatures are set forth uncorrected in degrees Celsius and, unless otherwise indicated, all parts and percentages are by weight.

The entire texts of all applications, patents and publications, if any, cited above and below, and of corresponding application French No. 88 07420, are hereby incorporated by reference.

EXAMPLES

EXAMPLE 1: THERMAL POLYMERIZATION (a) Manufacture of the dicyclopentadiene resin by thermal polymerization.

8 parts of a $C_6$-$C_{12}$ aromatic cut which has the following composition (% by weight) are introduced into a stainless steel Grignard type autoclave equipped with a jacket permitting heating by circulating hot oil, a stainless steel internal coil permitting cooling by circulating cold water, and with an "anchor" type stirrer:

| | |
|---|---|
| styrene | 2.89 |
| α-methylstyrene | 1.79 |
| β-methylstyrene | 0.68 |
| trans-β-methylstyrene | 2.25 |
| vinyltoluenes | 22.01 |
| indene | 12.93 |
| methylindenes + divinylbenzene | 3.37 |
| dicyclopentadiene | 0.61 |

71 parts of a dicyclopentadiene cut which has the following composition (% by weight) are then added to the reactor:

| | |
|---|---|
| dicyclopentadiene | 75.36 |
| methyldicyclopentadiene | 0.28 |
| trimethyldicyclopentadiene | 0.05 |
| dicyclopentadiene codimers | 3.43 |
| isopropenylnorbornene | 11.08 |
| 5-vinylnorbornene | 1.12 |
| light ends | 0.84 |
| unidentified | 3.64 |

21 parts of xylene are then added. The reaction mixture is heated to a temperature of 270° C. for 8 hours; the pressure reached in the reactor is 9 bars.

The resin solution is collected; the reaction yield is 64.7% based on the feedstock used, the degree of conversion of the reactants is 93%.

The resin obtained has a ring-and-ball softening point of 155° C. (determined according to ASTM Standard E 28) and a cloud point of 60° C., determined in a mixture of resin and of isododecane (50/50).

(b) Manufacture of a resin according to the invention

The resin manufactured above from a dicyclopentadiene cut is dissolved in a $C_6$-$C_{12}$, aromatic cut.

The $C_6$-$C_{12}$, aromatic cut has the following composition:

| | |
|---|---|
| styrene | 4.78 |
| α-methylstyrene | 1.77 |
| cis-β-methylstyrene | 2.40 |
| trans-β-methylstyrene | 2.54 |
| vinyltoluene | 15.74 |
| indene | 10.06 |
| methylindene | 7.62 |

The products are used in variable quantities. The polymerization is conducted in the presence of a Lewis acid consisting of boron trifluoride. Table 1 summarizes the quantities of reactants employed, the operating conditions and the characteristics of the finished resins obtained.

TABLE 1

| TEST | 1 | 2 | 3 | 4 | 5 | 6 |
|---|---|---|---|---|---|---|
| Mixture composition (weight %) | | | | | | |
| $C_6$-$C_{12}$ cut | 90.9 | 90.0 | 85 | 85 | 85 | 85 |
| Dicyclopentadiene resin | 9.1 | 9.1 | 15 | 15 | 15 | 15 |
| Operating conditions | | | | | | |
| Boron trifluoride (g/h) | 4.2 | 3.9 | 4.1 | 4.4 | 4.1 | 4.4 |
| Temperature (°C.) | 25 | 25 | 25 | 25 | 30 | 30 |
| Residence time (minutes) | 30 | 30 | 30 | 30 | 30 | 30 |
| Yield % | 43.4 | 39.8 | 38.8 | 45.6 | 42.7 | 45.7 |
| % conversion of the $C_6$-$C_{12}$ cut | 85.6 | 78.8 | 72.2 | 84.8 | 79.4 | 85 |
| Softening point (ring and ball, °C.) | 131 | 138 | 138 | 141 | 139 | 141 |
| Cloud point: °C. (50% isododecane) | 12 | 18 | 12 | 11 | 10 | 11 |

The ring-and-ball softening point is determined according to ASTM Standard E 28; the cloud point is determined in the mixture consisting of the resin and of isododecane (50/50 by weight).

EXAMPLE 2

Example 1 is repeated, but using a $C_6$-$C_{12}$ cut which has the following composition:

| | |
|---|---|
| styrene | 10.17 |
| α-Me styrene | 2.11 |
| cis-β-Me styrene | 4.22 |
| trans-β-Me styrene | 3.91 |
| vinyltoluenes | 11.19 |
| indene | 20.86 |
| Me styrene | 3.21 |

Table 2 summarizes the operating conditions and the results obtained.

TABLE 2

| TEST | 1 | 2 | 3 |
|---|---|---|---|
| Mixture composition (weight %) | | | |
| $C_6$-$C_{12}$ cut | 85 | 85 | 85 |
| Dicyclopentadiene resin | 15 | 15 | 15 |
| Operating conditions | | | |
| Boron trifluoride (g/h) | 4.6 | 5.6 | 5.6 |
| Temperature (°C.) | 30 | 30 | 50 |
| Residence time (minutes) | 30 | 30 | 30 |
| Yield % | 43.5 | 51.7 | 55.2 |
| % conversion of the $C_6$-$C_{12}$ cut | 52 | 67 | 73.4 |
| Softening point | 156 | 156 | 153 |
| Cloud point: °C. (50% isododecane) | 65 | 65 | 60 |

The preceding examples can be repeated with similar success by substituting the gererically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for the manufacture of aromatic petroleum resins having a softening point above 120° to 170°

C. and soluble in a aliphatic hydrocarbon solvent comprising cationically copolymerizing under polymerization conditions a product comprising a $C_6$–$C_{12}$ aromatic cut having a minor amount of dicyclopentadiene and a solid resin obtained by the thermal polymerization of a dicyclopentadiene cut having a major amount of dicyclopentadiene, the products being present in a dicyclopentadiene resin/aromatic cut weight ratio of between 0 and 100 to produce said aromatic petroleum resins, and wherein the solid resin obtained by the thermal polymerization of the dicyclopentadiene cut is dissolved in the $C_6$–$C_{12}$ aromatic cut before the cationic polymerization process.

2. A process according to claim 1 wherein the cationic polymerization is carried out at a temperature of 50° C. or below in the presence of at least one Lewis acid.

3. A process according to claim 1, wherein the thermal polymerization of the dicyclopentadiene cut is carried out in the presence of an aromatic solvent at a temperature of 240° to 270° C. for 2 to 10 hours.

4. An aromatic petroleum resin produced by the process of claim 1.

5. An aromatic petroleum resin produced by the process of claim 2.

6. An aromatic petroleum resin produced by the process of claim 3.

7. In a printing ink and vehicle, the improvement wherein the printing ink vehicle comprises an aromatic petroleum resin defined in claim 4.

8. In a varnish composition comprising a film former dissolved in a solvent, the improvement wherein the film former comprises an aromatic petroleum resin as defined in claim 4.

9. In a paint composition comprising a pigment and carrier, the improvement wherein the carrier comprises an aromatic petroleum resin as defined in claim 4.

10. A process according to claim 1, wherein the dicyclopentadiene resin/aromatic cut is in a weight ratio of 0 to 50.

11. A process according to claim 1, wherein the dicyclopentadiene resin/aromatic cut weight ratio is 2 to 10.

12. A process according to claim 1, wherein the dicyclopentadiene resin/aromatic cut weight ratio is 15 to 50.

13. An aromatic petroleum resin produced by the process of claim 1 having a softening point above 130° C.

14. An aromatic petroleum resin produced by the process of claim 1 having a softening point above 150° C.

15. A process according to claim 1, wherein the $C_6$–$C_{12}$ is of the following composition in percent by weight:

| | |
|---|---|
| styrene | 0.5–14 |
| allylbenzene | 0.5–2 |
| α-methylstyrene | 1–8 |
| cis-β-methylstyrene | 0.2–1 |
| trans-β-methylstyrene | 1–6 |
| vinyltoluenes | 7–22 |
| indene | 5–21 |
| methylindene + divinylbenzene | 0.2–9 |
| dicyclopentadiene | 0.4–12. |

16. A process according to claim 1, wherein the dicyclopentadiene is of the following composition in percent by weight:

| | |
|---|---|
| dicyclopentadiene | 70–95 |
| dicyclopentadiene codimers | 1–6 |
| methyldicyclopentadiene | 0.2–10 |
| trimethyldicyclopentadiene | 0.005–2 |
| 5-vinylnorbornene | 1–2 |
| isopropylnorbornene | 1–12 |
| (unidentified light ends) | less than 30. |

17. A process according to claim 15, wherein the dicyclopentadiene is of the following composition in percent by weight:

| | |
|---|---|
| dicyclopentadiene | 70–95 |
| dicyclopentadiene codimers | 1–6 |
| methyldicyclopentadiene | 0.2–10 |
| trimethyldicyclopentadiene | 0.005–2 |
| 5-vinylnorbornene | 1–2 |
| isopropylnorbornene | 1–12 |
| (unidentified light ends) | less than 30. |

18. An aromatic petroleum resin produced by the process of claim 15.

19. An aromatic petroleum resin produced by the process of claim 16.

20. An aromatic petroleum resin produced by the process of claim 17.

21. A process according to claim 1, wherein the dicyclopentadiene resin has a softening point of 155° C.

22. An aromatic petroleum resin produced by the process of claim 21.

* * * * *